(12) United States Patent
Meling et al.

(10) Patent No.: US 11,650,998 B2
(45) Date of Patent: May 16, 2023

(54) DETERMINING AUTHORITATIVE DOCUMENTS BASED ON IMPLICIT INTERLINKING AND COMMUNICATION SIGNALS

(71) Applicant: Microsoft Technology Licensing, LLC, Redmond, WA (US)

(72) Inventors: Jon Meling, Tromsø (NO); Jan-Ove Karlberg, Tromsø (NO); Vegar S Wang, Tromsø (NO); Jan Heier Johansen, Tromsø (NO); Bernhard Kohlmeier, Seattle, WA (US); Tor Kreutzer, Tromsø (NO); Torbjørn Helvik, Olso (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 23 days.

(21) Appl. No.: 16/917,229

(22) Filed: Jun. 30, 2020

(65) Prior Publication Data
US 2021/0406271 A1 Dec. 30, 2021

(51) Int. Cl.
*G06F 16/2457* (2019.01)
(52) U.S. Cl.
CPC .............................. *G06F 16/24578* (2019.01)
(58) Field of Classification Search
CPC ................................................. G06F 16/24578
See application file for complete search history.

(56) References Cited

U.S. PATENT DOCUMENTS

| | | | |
|---|---|---|---|
| 8,447,760 B1* | 5/2013 | Tong | G06F 16/355 |
| | | | 707/728 |
| 9,384,285 B1 | 7/2016 | Ding et al. | |
| 9,916,365 B1 | 3/2018 | Dick et al. | |
| 9,946,757 B2* | 4/2018 | Aravamudan | G06F 16/95 |
| 2009/0037355 A1* | 2/2009 | Brave | G06F 16/9535 |
| | | | 706/45 |
| 2014/0280062 A1* | 9/2014 | Augustin | G06F 16/9038 |
| | | | 707/722 |
| 2018/0210966 A1* | 7/2018 | Bedi | G06F 16/9024 |
| 2018/0285818 A1* | 10/2018 | Soltani | G06Q 50/01 |
| 2019/0130024 A1 | 5/2019 | Burchfield et al. | |

OTHER PUBLICATIONS

Tsatsaronis, George, et al. "Identifying free text plagiarism based on semantic similarity." Proceedings of the 4th International Plagiarism Conference. 2010. (Year: 2010).*
"International Search Report and Written Opinion Issued in PCT Application No. PCT/US21/029266", dated Jul. 1, 2021, 11 Pages.

* cited by examiner

*Primary Examiner* — Jay A Morrison

(57) ABSTRACT

Examples of the present disclosure describe systems and methods for determining authoritative documents based on implicit interlinking and communication signals. In aspects, a search operation may be initiated from one or more applications or services. The search operation may be processed to identify search information, such as one or more content items, content topics, or entities. The identified search information may be used to search one or more data sources for implicit relationships between the search information and content items and/or entities stored by the data sources. The results of the search may be collected and ranked according to one or more criteria. The ranked results may be provided in response to the search operation.

20 Claims, 11 Drawing Sheets

DETERMINING AUTHORITATIVE DOCUMENTS BASED ON IMPLICIT INTERLINKING AND COMMUNICATION SIGNALS

BACKGROUND

Due to the volume and commonality of content utilized by many entities (e.g., companies, individuals), much of the content is frequently reused by various members of or associated with the entities. In many cases, the content is reused via trackable means, such as hyperlinking. Hyperlinking enables access and usage statistics of the linked content to be tracked, as the linked content includes a specific reference back to the source from which it originates. Such statistics enable users to identify the relationship between the linked content and the source content. In other cases, the content is reused via less trackable means. For example, a chart within a first presentation document may simply be copied into a second presentation document, without making a specific reference back to the first presentation document. In such cases, information identifying the relationship between the linked content and the source content may not be available. As a result, users may not be aware of or find previously existing content, and users may therefore be required to recreate substantially similar content.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for determining authoritative documents based on implicit interlinking and communication signals. In aspects, a search operation may be initiated from one or more applications or services. The search operation may be processed to identify search information, such as one or more content items, content topics, or entities. The identified search information may be used to search one or more data sources for implicit relationships between the search information and content items and/or entities stored by the data sources. The results of the search may be collected and ranked according to one or more criteria. The ranked results may be provided in response to the search operation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
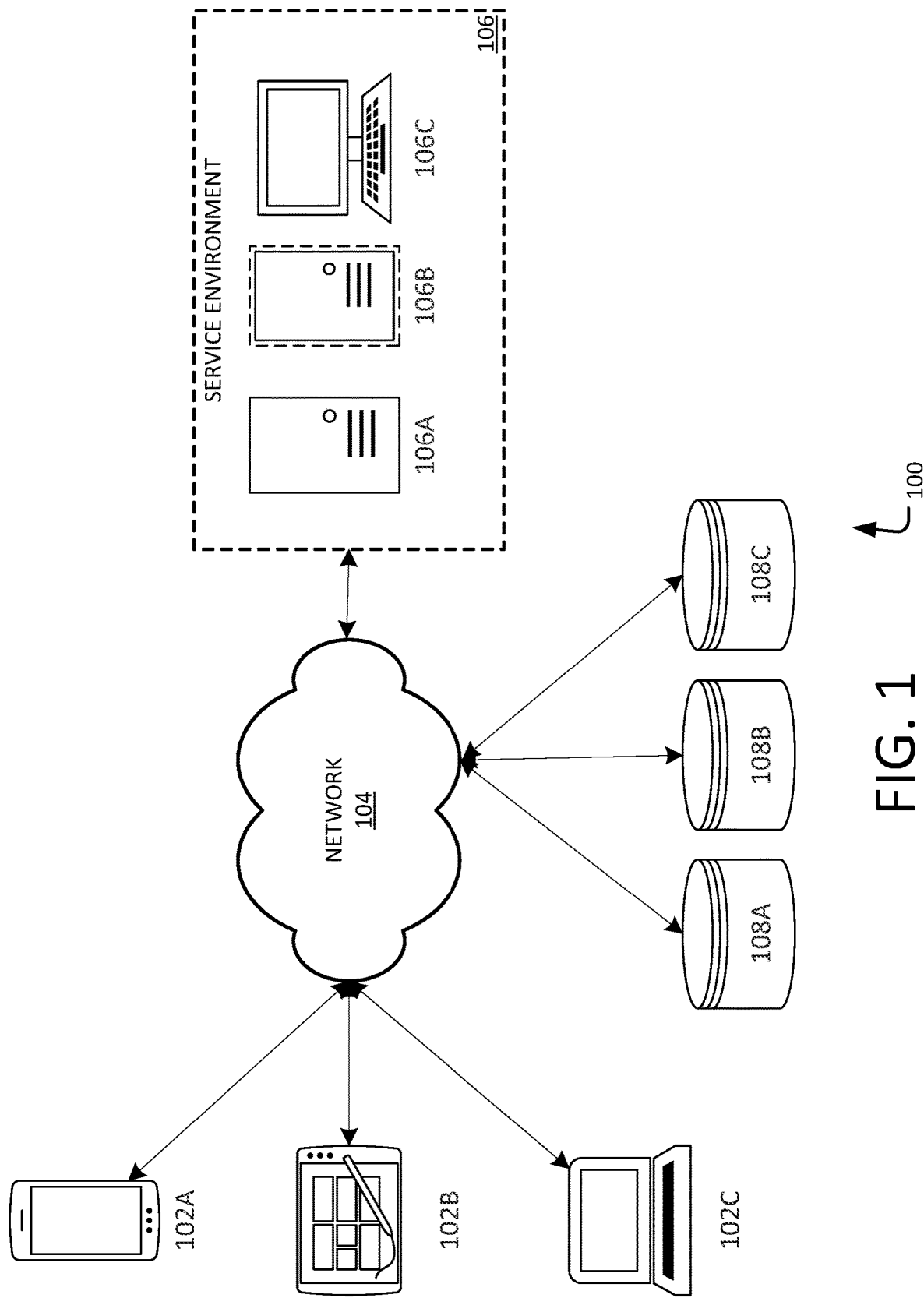
FIG. 1 illustrates an overview of an example system for determining authoritative documents based on implicit interlinking and communication signals as described herein.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

An extraordinary amount of content is generated every day. Although some of the content is original, the majority of the content is derivative. Derivative content, as used herein, may refer to content based on or derived from one or more existing original content items. The use of derivative content occurs frequently in large organizations and groups. In many cases, the original content is explicitly linked to the derivative content item (e.g., document, email, chat). Explicit linking, as used herein, may refer to an act of embedding original or source content from a first content item into a second content item or providing a reference from a first content item to a second content item. The reference may point to an entire content item or to a specific element within a content item. The use of explicit linking may include explicitly defining, by a user, a relationship between a source content item and a destination content item. Examples of explicit linking include, but are not limited to, including a hyperlink of the source content in a destination content item, including an identifier of the source content in the destination content item, and embedding the entirety of the source content into the destination content item. In such cases, the explicit linking enables access and usage statistics for the source content to be collected and tracked using various methods. The explicit linking and corresponding telemetry enable the source content (and/or content similar to the source content) to be identified as authoritative with respect to the destination content item.

In other cases, however, the source content is implicitly linked to a destination content item. Implicit linking, as used herein, may refer to an act of including a source content item within a destination content item. The use of implicit linking may include implicitly defining, by a data source or an associated application/service, relationships between a source content item and a destination content item. Examples of implicit linking may include, but are not limited to, copying a portion of a source content item to a destination content item (e.g., copy/paste), inserting source content into a destination content item via a content insert utility (e.g., Insert File function, Insert Image function), including in a destination content item content that is similar (e.g., semantically similar) to or derived from content in a source content item, or implicitly referencing the source content (e.g. "that document," "the March meeting chart"). In such cases, the destination content item provides no explicit identification of the source content. Without the explicit identification, the source content is unable to be identified as authoritative with respect to the destination content item. Moreover, additional content that may be authoritative with respect to the source content is unable to be identified. In examples, authoritative content may correspond to source content and may be more accurate, reliable, and/or extensive than the source content item or the destination content item. For instance, the source content may be derivative content that is copied from a well-known, authoritative source comprising an extensive analysis of the source content and/or topics related thereto. Thus, as a result of the lack of explicit identification, the source content (or portions thereof) may be needlessly, and perhaps inaccurately, recreated, in whole or in part. Such recreation of preexisting content is an ineffective use of time, assets, resources, and established knowledge bases.

To address the challenges with identifying implicitly linked content, the present disclosure describes systems and methods for determining authoritative documents based on implicit interlinking and communication signals. In aspects, a search query may be initiated from one or more applications, services, or other entry points. The search query may be implicitly or explicitly initiated. As one example, a user may explicitly cause the execution of a search query (e.g., by selecting a 'Search' button/control) upon submitting a search query to a search service. As another example, a background process of an application or service may generate one or more search queries as a user provides content to (or otherwise interacts with content of or relating to) the application or service. The search query(ies) may be used to automatically initiate a search query.

In aspects, the search query may be executed against one or more data sources comprising information for various content items and/or entities. Content items, as used herein, may refer to textual, visual, and/or aural content. Examples of content items include documents, text, images, sounds, videos, animations, etc. Entities, as used herein, may refer to an object (or an instance thereof) to which information pertains. Examples of entities may include individuals, groups, organizations, etc. Examples of data sources include databases (e.g., relational databases, graph databases), flat files, and the like. In examples, the data sources may comprise data relating to various applications or services. The information may include properties and values relating to the content items and entities, and/or relationships between the content items and/or entities. In examples, the relationships may include explicit linking data and/or implicit linking data. Explicit linking data may include relationships explicitly defined by a user. For instance, a user may manually include a hyperlink to a first document within a second document. The hyperlink may be defined in the data source (e.g., by a user of a process of the data source) as an explicit link between the first and second document. Implicit linking data may include relationships implicitly defined by the data source or an associated application or service. For instance, a portion of content may be copied from a first document to a second document. The copying action may define an implicit link between the first and second document.

In aspects, the search query may identify a set of search results. The search results may comprise content items from one or more application or services. At least one of the content items in the search results may be a content item that was specifically referenced by the search query. The search results may additionally comprise content items that are implicitly related to the content item referenced by the search query. Identifying implicitly related content items may include comparing one or more terms in the search query to one or more terms or tags associated with the content items in the data sources. In at least one example, the set of search results may not include the content item specifically referenced by the search query. In such an example, the content item referenced by the search query may not be accessible to a querying user, may not be included in the searched data sources, or may be a generic or general reference to other content items (e.g., "financial reports"). After identifying the set of search results, the set of search results may be ranked according to one or more criteria and/or communication signals. Example criteria and/or communication signals include, but are not limited to, number of views, number of mentions, number of times referenced in other content items, popularity rankings, number of views by a user's social circle (e.g., family, friends, colleagues), number of views by experts or knowledgeable entities, author attributes (e.g., area of expertise, experience level, number of publications, awards, educational details), semantic and/or topical similarities with the content item identified by the search query, creation/modification data, and/or consumption-related session metrics (e.g., dwell time, bounce rate, click-through rate, conversion rate). The ranked set of search results may represent authoritative content items with respect to the content item referenced by the search query and may be provided to a user in response to performance of the search query. In examples, the content item specifically referenced by the search query may not be among the top ranked content items or may not be included in the ranked set of search results.

Accordingly, the present disclosure provides a plurality of technical benefits including but not limited to: improving content item identification, improving the precision of identifying authoritative content items, tracking and identifying implicitly linked content items, using user communication signals to improve content item ranking, providing an understanding of the impact of a particular content item, facilitating content reuse to reduce content recreation and content inaccuracy, among other examples.

FIG. 1 illustrates an overview of an example system for determining authoritative documents based on implicit interlinking and communication signals as described herein. Example system 100 as presented is a combination of interdependent components that interact to form an integrated whole. Components of the system may be hardware components or software components implemented on and/or executed by hardware components of the system. In one example, system 100 may provide an operating environment for software components to execute and utilize resources or facilities of system 100. An example of one or more processing devices comprising such an operating environment is depicted in FIGS. 7-10. In another example, the components of systems disclosed herein may be distributed across multiple devices. For instance, input may be entered on a client device and information may be processed or accessed from other devices in a network, such as one or more cloud or remote server devices.

As one example, system 100 comprises computing devices 102A-C, network 104, service environment 106, computing devices 106A-C, and data stores 108A-C. One of skill in the art will appreciate that the scale of systems such as system 100 may vary and may include more or fewer components than those described in FIG. 1. Examples of computing devices 102A-C include, but are not limited to, a personal computer (PC), a mobile device (e.g., smartphone/phone, tablet, laptop, personal digital assistant (PDA)), a wearable device (e.g., smart jewelry, a body-mounted device), or the like. In aspects, computing devices 102A-C may comprise, or have access to, one or more software applications or services. Examples of software applications or services include, but are not limited to, presentation tools, word processing tools, spreadsheet tools, calendar/tasking tools, messaging tools, content discovery/retrieval tools, and personal digital assistant tools. The software applications or services may collect input from users using one or more sensor devices. Examples of sensor devices include microphones, touch-based sensors, keyboards, pointing/selection tools, optical/magnetic scanners, accelerometers, magnetometers, and gyroscopes. The collected input may include, for example, voice input, touch input, text-based input, gesture input, and/or video/image input. In examples, collection and/or storage of the input may be subject to one or more data privacy protections or criterion. For example, users may be required to "opt-in" or otherwise consent to the collection, storage, and/or evaluation of the input. As another example, users may be permitted to review, edit/redact, and/or selectively restrict access to the collected input. As still another example, the system may anonymize or encrypt personally identifiable information.

In aspects, computing devices 102A-C may provide the collected input to an input processing component. The input processing component may be installed on or accessed locally by computing devices 102A-C. Alternately, the input processing component may be accessed remotely by computing devices 102A-C. For example, computing devices 102A-C may transmit the collected input to an external device or service, such as service environment 106, via network 104. Although service environment 106 is illustrated as external to computing devices 102A-C, it is contemplated that service environment 106 may be provided by, or locally accessible to, computing devices 102A-C. In examples, service environment 106 may comprise computing devices, such as computing devices 106A-C. Examples of computing devices 106A-C include, but are not limited to, a PC, a server device, a cloud computing device, a virtual device, or the like. In at least one example, service environment 106 may additionally or alternately comprise computing devices 102A-C and/or data stores 108A-C.

Upon receiving the collected input, the input processing component may perform processing techniques to identify search information (e.g., one or more terms, topics, or content items) in or relating to the collected input. The search information may be used to generate one or more search queries. The search queries may be used to search data stores 108A-C for content items, relationship data, and/or property information relating to the collected input. Examples of data stores 108A-C include, but are not limited to, databases, data tables, data files, or similar data structures storing data. Based at least upon the identification of implicit relationship data, search results may be collected from data stores 108A-C and ranked according to one or more criteria or communication signals to identify authoritative content items. Aspects of the ranking may be performed by computing devices 102A-C, computing devices 106A-C, data stores 108A-C, or a combination thereof. The ranked search results may be provided to and/or presented by computing devices 102A-C.

In aspects, computing devices 102A-C and/or computing devices 106A-C may cause data in data stores 108A-C to be updated or otherwise modified. For example, a monitoring process executing on computing device 102A may detect a user action that creates an implicit link between two content items. In response to detecting the user action, computing device 102A may transmit information associated with the implicit linking (e.g., content item identifiers, relationship information, user action information, expiration information) to data stores 108A-C. Upon receiving the transmitted information, data stores 108A-C may update the stored data to reflect the implicit linking of the content items.

Figure 2:
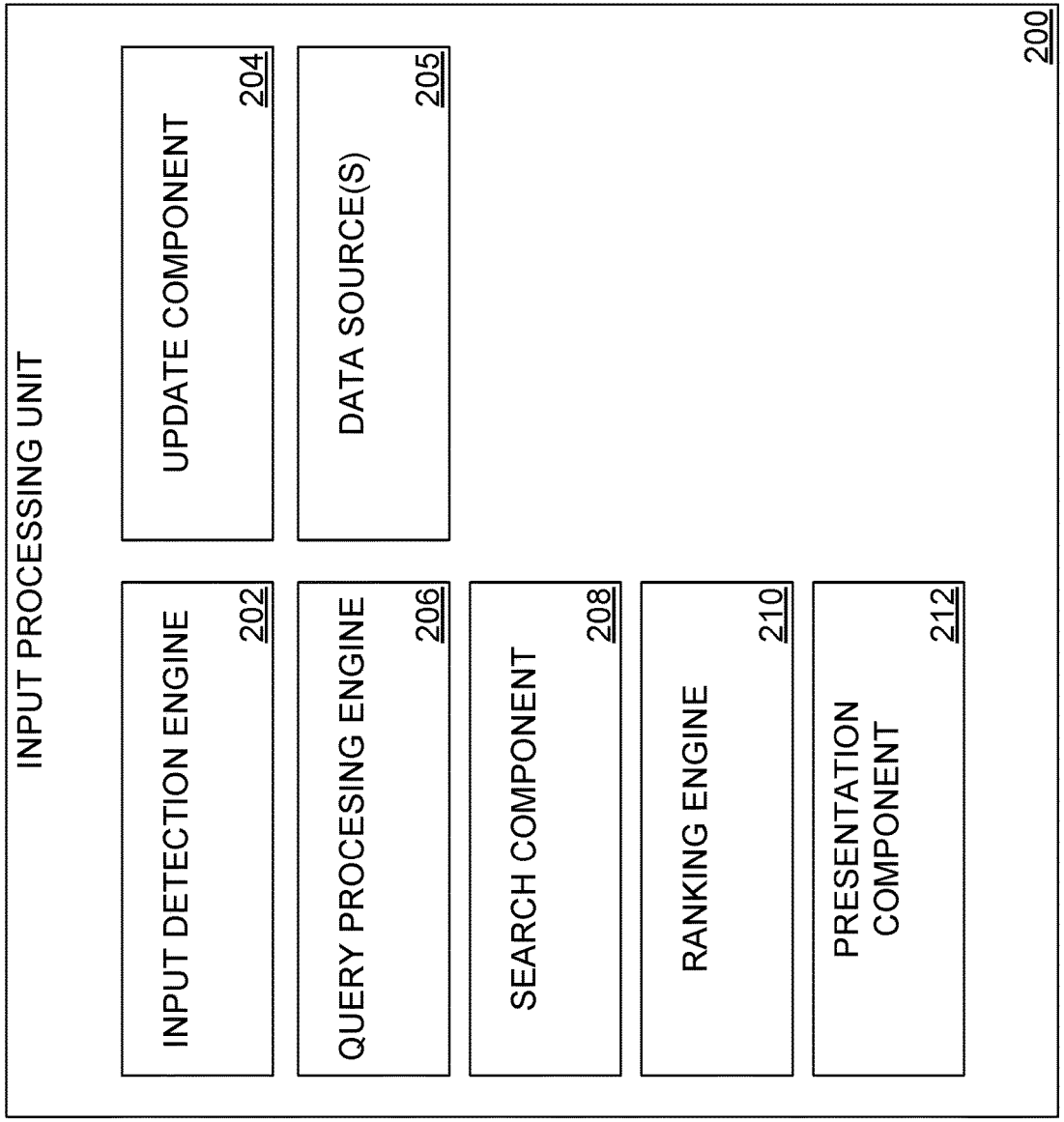
FIG. 2 illustrates an example input processing unit for determining authoritative documents based on implicit interlinking and communication signals as described herein.

FIG. 2 illustrates an example input processing unit 200 for determining authoritative documents based on implicit inter-linking and communication signals as described herein. The authoritative document determination techniques implemented by input processing unit 200 may comprise the techniques and data described in system 100 of FIG. 1. Although examples in FIG. 2 and subsequent figures will be discussed in the context of documents, the examples are equally applicable to other contexts, such as content items generally. In some examples, one or more components of input processing unit 200 (or the functionality thereof) may be distributed across multiple devices. In other examples, a single device (comprising at least a processor and/or memory) may comprise the components of input processing unit 200.

In aspects, input processing unit 200 may comprise input detection engine 202, update component 204, data source(s) 205, query processing engine 206, search component 208, ranking engine 210, and presentation component 212. One of skill in the art will appreciate that the scale of input processing unit 200 may vary and may include additional or fewer components than those described in FIG. 2. For example, the functionality of query processing engine 206, search component 208, and/or ranking engine 210 may be combined into a single component, model, or algorithm.

Input detection engine 202 may be configured to receive or detect input for one or more users or devices, such as computing devices 102A-C. The input may include audio data, touch data, text-based data, gesture data, video/image data, etc. Detecting the input may include using one or more background processes that monitor and/or capture user input in real-time. Upon receiving the input, input detection engine 202 may perform one or more steps in a first set of pre-processing steps. The first set of pre-processing steps may include, for example, parsing the input into one or more input types (e.g., audio data, video data, text data), identifying user/device identifiers (e.g., user/account name, device name/type), identifying entry point information (e.g., identify application or service used to collect the input), identifying date/time information, identifying input attributes (e.g., length of input, subject and/or content of input), and storing and/or labeling the input, etc.

As one example, input detection engine 202 may detect a copy/paste action that copies content from a first document into a second document. Upon detecting the copy/paste action, input detection engine 202 may identify property data associated with the first document, the second document, and/or the user or user device performing the copy/paste action. Example property data includes, but are not limited to, source and destination document identifiers, document section identifiers (e.g., title, body, slide number), document metadata, identification of copied content, section or location of pasted content, action information (e.g., copy/paste, insert hyperlink, embed content, date/time), and user information (e.g., user name, account name, user authorization, user role/title, user group/membership). Input detection engine 202 may provide at least a portion of the identified property data to update component 204.

Update component 204 may be configured to modify one or more data sources, such as data sources(s) 205, and/or data therein based on the property data from input detection engine 202. Data sources(s) 205 may comprise, for example, data relating to one or more content items, entities, or events and/or relationship and property data associated therewith. The data in data sources(s) 205 may be associated with one or more applications or services (e.g., word processing applications, presentation applications, communication applications, calendaring applications, tasking applications, workflow applications). Modifying data sources(s) 205 may include adding data to, removing data from, or updating data in one or more databases, data tables, data files, or similar data structures storing data. For example, in response to receiving property data relating to an implicit linking event between two documents, update component 204 may use the received property data to add one or more of the documents to an existing data structure (such as a graph database), add an indication of the implicit link to the existing data structure, and add a user relationship with one or more of the documents to the data structure.

As another example, input detection engine 202 may detect a received search query relating to a content item. Upon detecting the search query, input detection engine 202 may identify one or more terms in the search query. Alternately, input detection engine 202 may provide the search query to query processing engine 206. Query processing engine 206 may be configured to perform one or more steps in a second set of pre-processing steps. The second set of pre-processing steps may be performed prior to executing the search and may include, for example, identifying one or more terms, entities, or content items in or relating to the search query, identifying terms that are synonymous or similar to terms in the search query, identifying one or more topics or categories associated with identified terms, modifying the received search query, generating additional search queries and/or subqueries based on identified terms or topics, and identifying suitable data sources, etc. Query processing engine 206 may provide the received search query and/or one or more additional queries to search component 208.

Search component 208 may be configured to search one or more data sources, such as data source(s) 205, using one or more queries received from query processing engine 206. In examples, search component 208 may use a received search query to identify one or more search results (e.g., content items, entities, relationships, or associated properties) in a data source. Upon identifying the search result(s), search component 208 may search the data source (and/or alternate data sources) to identify content items, entities, and/or relationships related to the search result(s). Identifying the related content items may include evaluating relationships between the search result and the related content items. For example, search component 208 may traverse the various nodes of a data source, such as a graph database, to identify content items having a defined relationship with the search result. The relationship may be defined explicitly (e.g., hyperlinked_to, embedded_in, has_attachment) or implicitly (e.g., copied_to, referenced_by). Upon identifying content items that are implicitly linked to the search result, search component 208 may aggregate the content items into a set of search results. Search component 208 may provide the set of search results to ranking engine 210.

Ranking engine 210 may be configured to rank a set of search results according to one or more criteria and/or communication signals. Example criteria/communication signals include number of views, number of times referenced, viewer attributes, author attributes, semantic analysis data, creation/modification data, and consumption-related session metrics. Ranking the set of search results may include the use of one or more ranking algorithms or models, such as a Boolean model (BIR), a vector space model, a probabilistic model, or a relevance/pseudo relevance feedback model. For example, a vector space model or other machine learning (ML) technique may be used to compare terms in a search query (and/or the search result) to content item tags associated with various content items in the set of search results. The content items may be ranked according to the degree of similarity between content item tags of the content items and the terms in the search query and/or search result. For instance, a top 'N' search results may be identified. The top 'N' search results may represent the most authoritative content items with respect to the search query and/or the search result identified by search component 208. In some examples, the search result identified by search component 208 may not be included in the top 'N' search results. Ranking engine 210 may provide the set of ranked search results to presentation component 212.

Presentation component 212 may be configured to present the set of ranked search results to a user. In some aspects, presentation component 212 may present the set of ranked search results in a standardized list of search results. For example, the set of ranked search results may be arranged in a default format/style regardless of the search query entry point. In other aspects, presentation component 212 may present the set of ranked search results in the context of the search query entry point. As one example, search results for a search query submitted as voice input may be presented to the user as voice output. As another example, search results for a search query submitted via an email application may be presented using content (e.g., emails, attachments, contact cards, meeting invites) from the email application. As yet another example, search results for a non-user search query (e.g., a search query not explicitly generated by a user) submitted by a word processing application may be presented as a recommendation using, for instance, a comment or a speech bubble of the word processing application, a document suggestion on an entry point of the word processing or other application, or a hub application comprising or related to the word processing or other application.

Having described various systems that may be employed by the aspects disclosed herein, this disclosure will now describe one or more methods that may be performed by various aspects of the disclosure. In aspects, methods 300-400 may be executed by an execution environment or a system such as system 100 of FIG. 1 or input processing unit 200 of FIG. 2. However, methods 300-400 are not limited to such examples. In other aspects, methods 300-400 may be performed by a single device comprising an application or service. In at least one aspect, methods 300-400 may be executed (e.g., computer-implemented operations) by one or more components of a distributed network, such as a web service/distributed network service (e.g. cloud service).

Figure 3:
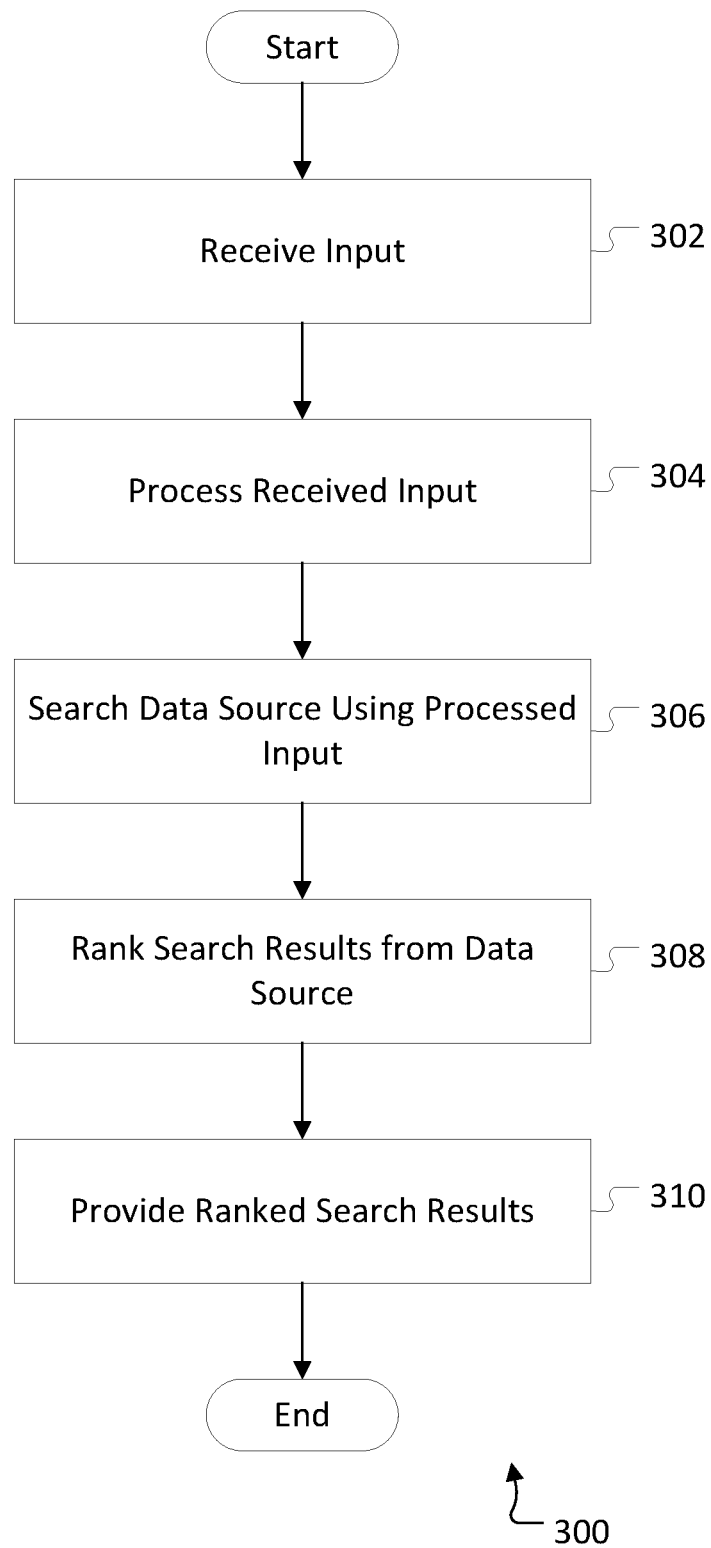
FIG. 3 illustrates an example method for determining authoritative document based on implicit interlinking and communication signals as described herein.

FIG. 3 illustrates an example method 300 for determining authoritative documents based on implicit interlinking and communication signals. Example method 300 begins at operation 302, where input is received. In aspects, input may be received in response to user interaction with one or more user devices, such as computing devices 102A-C. The user interaction may correspond to an explicit user search request, an implicit user search request, a non-search user activity, or any other type of user search or activity. User interaction corresponding to an explicit user search request may include, for example, a user providing a query relating to one or more content items, content topics, or entities. For instance, a user may enter via a hardware or virtual keyboard the query "FY2020 Report," and manually select a "Search" button or control to search for the content item FY2020 Report.doc. User interaction corresponding to an implicit user search request may include, for example, a user providing input requesting one or more specific content items, content topics, or entities. For instance, during a chat session among multiple users, a user may provide a request for "the FY2020 Report" (e.g., "Can someone send me the FY2020 Report?"). The input may be interpreted as an implicit user search request for the specific content item FY2020 Report.doc. Alternately, during the chat session, a user may make a reference to "the document" when discussing the content item FY2020 Report.doc (e.g., "Can someone send me the document?"). The input may be interpreted as an implicit user search request for a specific content item and the chat session may be evaluated to identify the corresponding content item (i.e., FY2020 Report.doc). User interaction corresponding to non-search user activity may include, for example, a user providing input referencing one or more specific content items, content topics, or entities. For instance, while composing an email message, a user may provide content (e.g., compose content, cut/paste content) regarding annual company earnings. Although no user search request may be identified, an input detection component, such as input detection engine 202, may monitor the input for references to content items, content topics, or entities.

At operation 304, received input may be processed. In aspects, a processing component, such as query processing engine 206, may perform one or more processing steps on or associated with the received input. The processing steps may include, for example, identifying one or more terms, entities, or content items referenced by or relating to the input, identifying terms that are synonymous with or similar to terms in the input, identifying one or more topics or categories associated with identified terms in the input, modifying the received input (e.g., adding and/or removing terms), generating search queries and/or subqueries based on identified terms or topics, identifying data sources comprising relevant content, and/or other steps. As one specific example, upon receiving a user search query for "FY2020 Report," the user query may be processed such that the term "FY" is identified to refer to "Fiscal Year"; "2020" is identified to refer to the time period "01/01/2020-12/31/2020;" "Report" is identified to refer to "Annual Report;" and "Annual Report" is identified as synonymous with "Yearly Report" and "Earnings Report." As a result, one or more subqueries comprising various combinations of the identified terms may be generated (e.g., "Fiscal Year 2020 Report," "FY2020 Annual Report," "2020 Fiscal Year Earnings Report"). In at least one example, one or more data sources comprising content items accessible to a particular user or user device may be identified based on terms in the received input. For instance, a file directory of accounting files may be added to a list of data sources to be searched based on terms/topics in received input and/or a user's designated organizational role or title.

At operation 306, one or more data sources may be searched. In aspects, the input processed by the processing component ("processed input") may be used to search one or more data sources for a content item referenced by the received input. Searching the data source(s) may include using regular expressions, fuzzy logic, a pattern recognition model/equation, etc. Upon identifying the content item (or a content item related to the content item) within a data source, the data source (and/or alternate data sources) may be searched to identify additional content items related to the identified content item. Alternately, if the content item referenced by the received input cannot be identified within a data source, a content item related to the content item ("related content item") may be identified and additional content items related to the related content item may be identified. Identifying the related and/or additional content items may include evaluating properties and relationships between an identified content item and the related/additional content items. As one specific example, a search using processed input may identify the content item "FY2020 Report.doc" within a data source. The identified content item may be represented in the data source as a node comprising one or more edges (e.g., relationships) connecting the identified content item to additional content items. Each of the edges connected to the identified content item may be evaluated to identify whether the identified content item is, for example, explicitly or implicitly linked to an additional content item. For instance, an edge representing an implicit link between an identified content item and an additional content item may indicate that content of one of the content items has been copied to or is referenced by the other content item. Upon identifying additional content items relating (e.g., explicitly or implicitly linked) to the identified content item, the identified content item and the additional content items may be added to a set of search results.

At operation 308, the set of search results may be ranked. In aspects, a ranking component, such as ranking engine 210, may rank the set of search results based on one or more criteria and/or communication signals. The criteria and/or communication signals may include, for example, a relationship between the identified content item and an additional content item (e.g., explicitly or implicitly linked), number of views, number of times referenced, viewer attributes, author attributes, semantic analysis data, creation/modification data, and consumption-related session metrics. Ranking the set of search results may include assigning one or more scores and/or weighting values to the various criteria and/or communication signals using a ranking algorithm or ranking models. In examples, content items in the set of search results that are explicitly or implicitly linked to the identified content item may be assigned a score/weight indicating an increased importance. For instance, explicitly linked content items may be assigned a multiplier value of 1.0 (highest importance), implicitly linked content items may be assigned a multiplier value of 0.8 (high importance), content items having in excess of a specified number of views may be assigned a multiplier value of 0.4 (moderate importance), etc. Respective content item scores may be generated by combining (e.g., summing, multiplying) the scores/values associated with each criterion and/or communication signal for a content item. The content item scores may be sorted and ranked (e.g., highest to lowest, lowest to highest). In some examples, the top 'N' content items in the set of search results may be ranked and the remaining content items may be removed from the set of search results. The top 'N' content items may represent content items that are authoritative with respect to a content item or content topic identified by the received input. In at least one example, the top 'N' content items may not include the identified content item. In such an example, the omission of the identified content item from the top 'N' content items may indicate that the top 'N' content items are more authoritative than the identified content item.

At operation 310, the ranked set of search results may be provided. In aspects, an output component, such as presentation component 212, may be used to provide the ranked set of search results to a user. The ranked set of search results may be provided in a context relevant to the user interaction associated with the received input. For example, input (e.g., a search query for "FY2020 Report.doc") may be provided to a search utility of an email service. Various email folders of the user (e.g., Inbox, Archived, Deleted) may be searched and a ranked set of search results may be generated. The ranked set of search results may be provided to the user using an interface of the email service. For instance, a list of emails and/or meetings comprising attachments listed within the ranked set of search results may be displayed in a results window of the email service.

Figure 4:
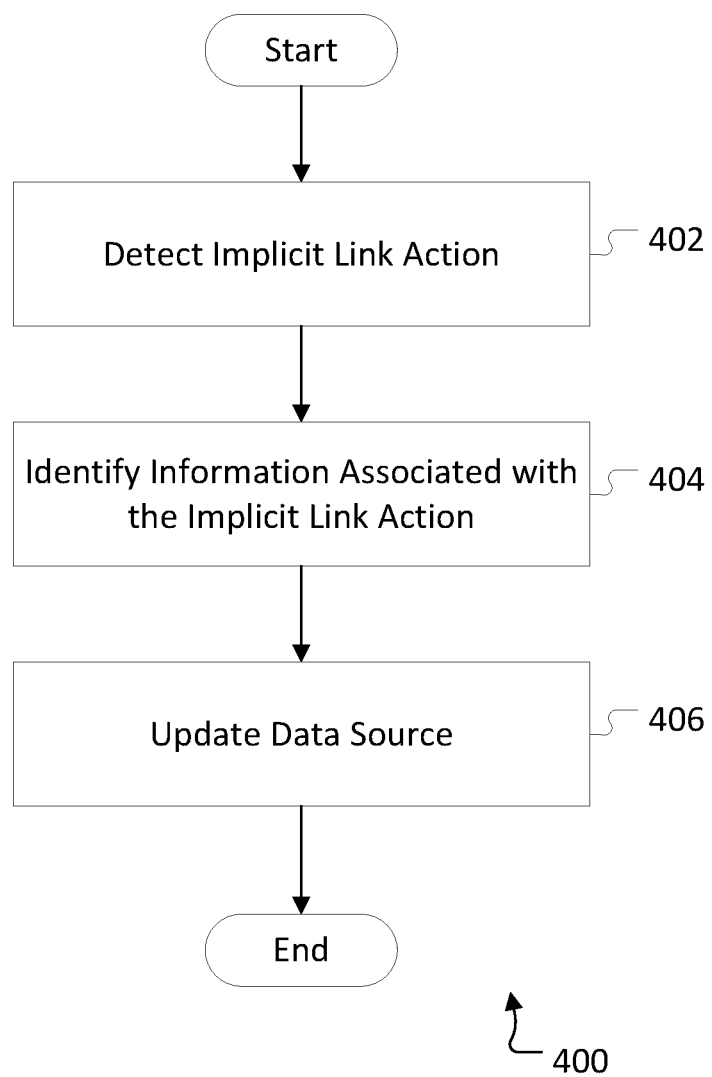
FIG. 4 illustrates an example method for capturing implicit relationship data as described herein.

FIG. 4 illustrates an example method 400 for capturing implicit relationship data. Example method 400 begins at operation 402, where an implicit link action is detected. In aspects, a user action indicating an implicit link may be detected by a user device. Detecting the user action may include using an input monitoring component, such as input detection engine 202. The user action may correspond to, for example, a copy/paste or cut/paste action, providing a reference a content item, or the like. As one example, a user may copy a chart from a first document into a second document. As another example, a user may add a reference to a chart from a first document into a second document. For instance, the user may add "See, Chart 1 of the Annual Report" into the content item Quarterly Report.doc (e.g., second document), where "the Annual Report" refers to the content item FY2020 Report.doc (e.g., the first document). Determining that "the Annual Report" refers to FY2020 Report.doc may include evaluating one or more dialogues or conversations, emails or email chains, documents, or other content items using one or more data analysis or ML techniques.

At operation 404, information associated with the implicit link action may be identified. In aspects, upon detecting an implicit link action, information associated with the implicit link action may be identified, extracted, and/or stored by the user device. The information may include, for example, content item identifiers, content item section identifiers, content item relationship indicators, content item metadata, user or user device identifiers, user data/attributes, user action data, action storage information (e.g., data update/storage location, storage expiration data), etc. For instance, continuing from the above example, the input monitoring component may identify the following information:
    user action: copy/paste
    source content item identifier: CAUsers\DocaY2020 Report.doc
    source section identifier: Chart 1.jpeg
    destination content item identifier: C:\Users\Docs\Quarterly Report.doc
    destination section identifier: Document Overview
    relationship type: implicit link
    data source: Accounting_Database.mdf In some examples, the identified information may be extracted, and a hashing function may be used to assign hash identifiers to one or more portions of the identified information. The hash identifiers and/or the identified information may be provided one or more data sources to be updated.

At operation 406, a data source may be updated. In aspects, information associated with the implicit link action may be used to update one or more data sources. Updating a data source may include, for example, modifying (e.g., creating, updating, or deleting) one or more content items, content item properties, relationships, or representations thereof. For instance, continuing from the above example, a node representing the content item Quarterly Report.doc may previously exist in the data source Accounting_Database.mdf. Upon receiving the information associated with the implicit link action, a node representing the content item Quarterly Report.doc may be added to Accounting_Database.mdf. Additionally, one or more relationships or edges (e.g., copied_to/copied_from) identifying an implicit link between the Quarterly Report.doc node and the FY2020 Report.doc node may be added to Accounting_Database.mdf.

Figure 5:
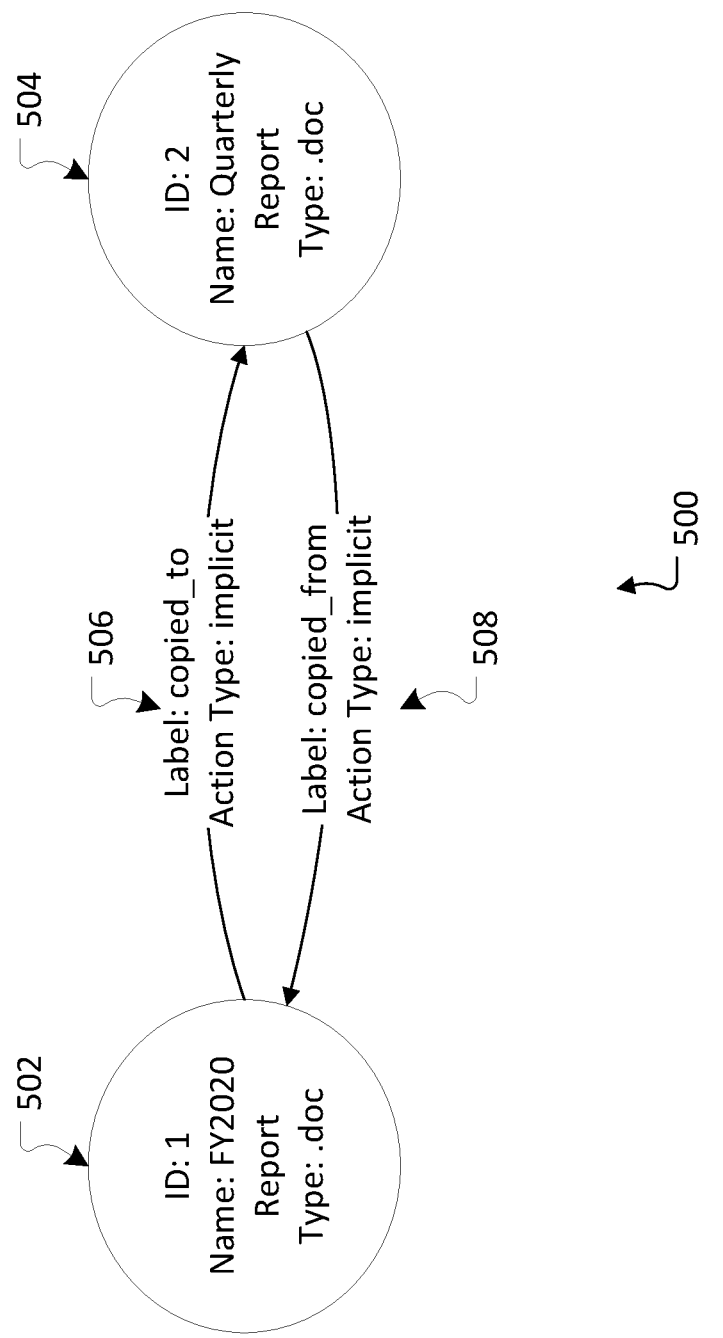
FIG. 5 is an example diagram comprising implicitly linked content items as described herein.

FIG. 5 illustrates an example diagram 500 comprising implicitly linked content items. In FIG. 5, diagram 500 comprises nodes 502 and 504 and edges 506 and 508. Node 502 represents content item FY2020 Report.doc and comprises properties (e.g., ID, Name, Type) associated with the content item. Node 504 represents content item Quarterly Report.doc and comprises properties (e.g., ID, Name, Type) associated with the content item. Edge 506 represents the relationship between node 502 and node 504 from the perspective of 502. Edge 506 is assigned the label "copied_to," which indicates content from node 502 has been copied to node 504. Edge 506 is also assigned the action type "implicit," which indicates that node 502 and 504 are implicitly linked. Edge 508 represents the relationship between node 502 and node 504 from the perspective of 504. Edge 508 is assigned the label "copied_from," which indicates content from node 504 has been copied from node 502. Edge 506 is also assigned the action type "implicit," which indicates that node 502 and 504 are implicitly linked.

Figure 6:
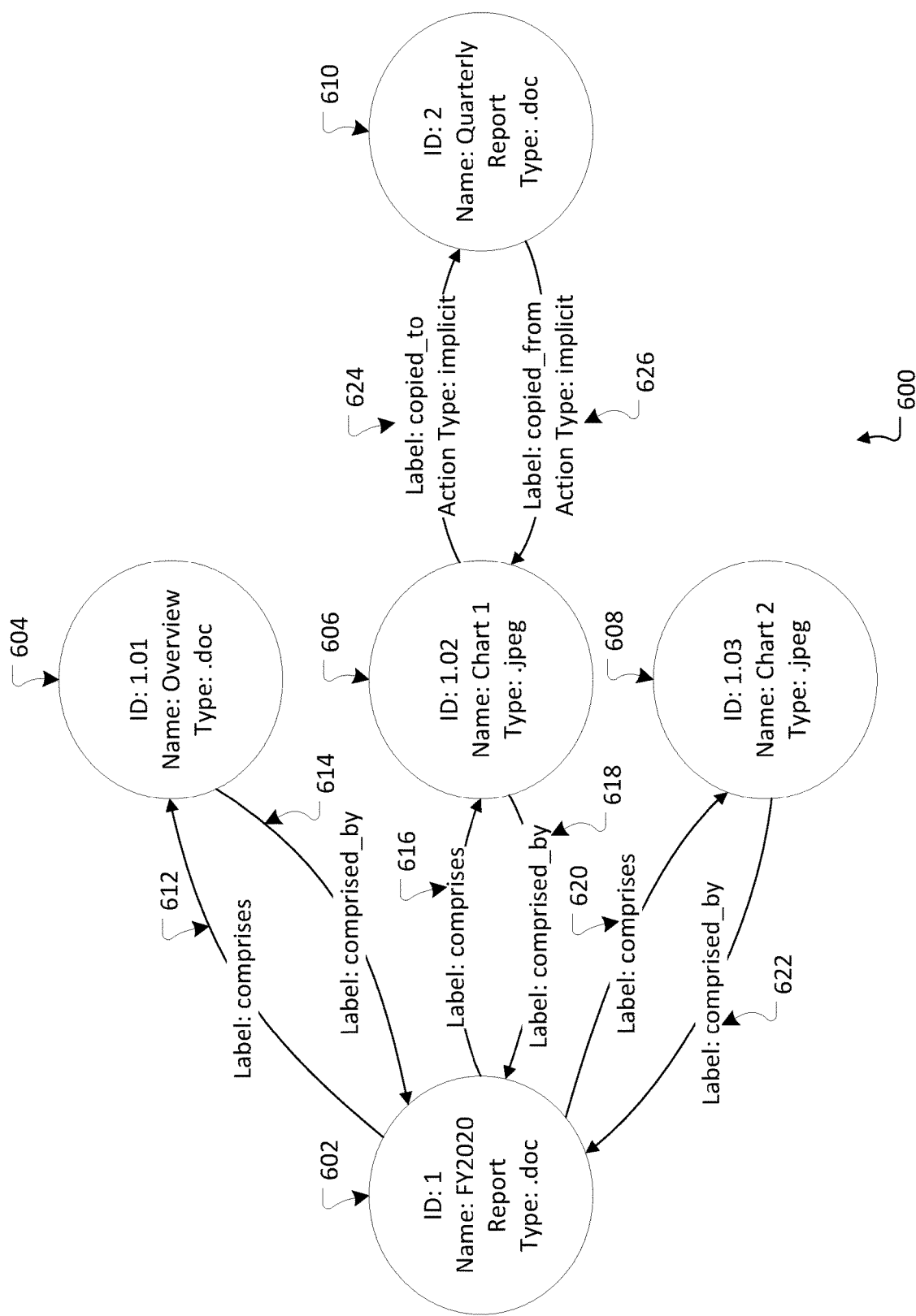
FIG. 6 is an alternate example diagram comprising implicitly linked content items as described herein.

FIG. 6 illustrates an alternate example diagram 600 comprising implicitly linked content items. In FIG. 6, diagram 600 comprises nodes 602, 604, 606, 608, and 610 and edges 612, 614, 616, 618, 620, 622, 624, and 626. Node 602 represents content item FY2020 Report.doc and comprises properties (e.g., ID, Name, Type) associated with the content item. Nodes 604, 606, and 608 represent portions or sections of content item FY2020 Report.doc. For example, node 604 represents an overview section of FY2020 Report.doc, node 606 represents a first chart in FY2020 Report.doc, and node 608 represents a second chart in FY2020 Report.doc. Edges 612 and 614 represent the relationship between node 602 and node 604, edges 616 and 618 represent the relationship between node 602 and node 606, and edges 620 and 622 represent the relationship between node 602 and node 608. Each of edges 612, 614, 616, 618, 620, and 622 indicate that nodes 604, 606, and 608 are portions or sections of (e.g., comprised_by) node 602. Edges 624 and 626 represent the relationship between node 606 and node 610. Edge 624 is assigned the label "copied_to" and the action type "implicit," which collectively indicate that Chart 1 from node 602 has been copied to node 610. In some examples, additional nodes representing portions or sections of node 610 may be displayed, similarly to nodes 604, 606, and 608. In such examples, there may be one or more relationships between portions or node 610 and nodes 604, 606, and 608. For instance, there may be a "copied_to" relationship between node 606 and a "Charts" section node of node 610.

FIGS. 7-10 and the associated descriptions provide a discussion of a variety of operating environments in which aspects of the disclosure may be practiced. However, the devices and systems illustrated and discussed with respect to FIGS. 7-12 are for purposes of example and illustration and are not limiting of a vast number of computing device configurations that may be utilized for practicing aspects of the disclosure, described herein.

Figure 7:
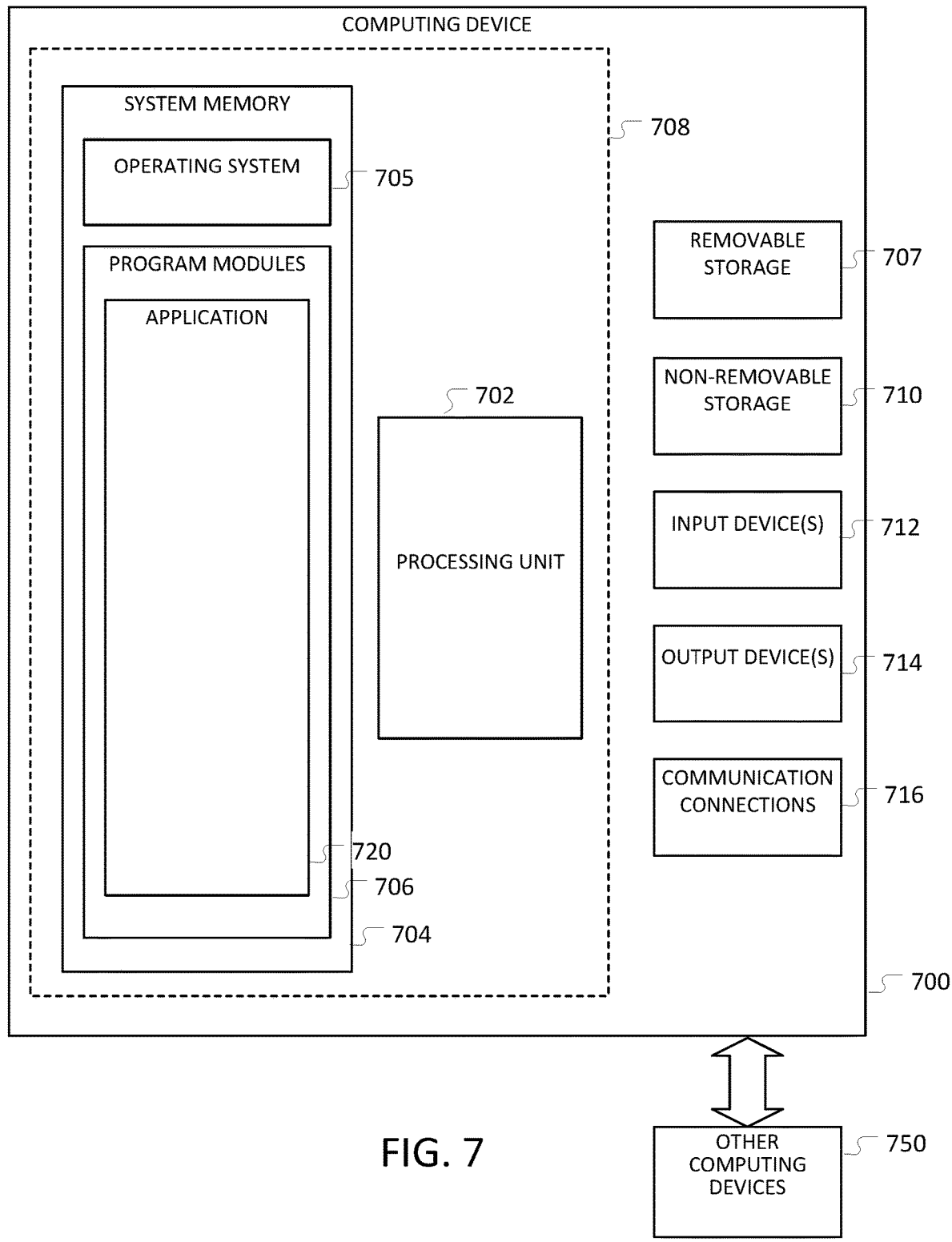
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices and systems described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories.

The system memory 704 may include an operating system 705 and one or more program modules 706 suitable for running software application 720, such as one or more components supported by the systems described herein. The operating system 705, for example, may be suitable for controlling the operation of the computing device 700.

Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., application 720) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
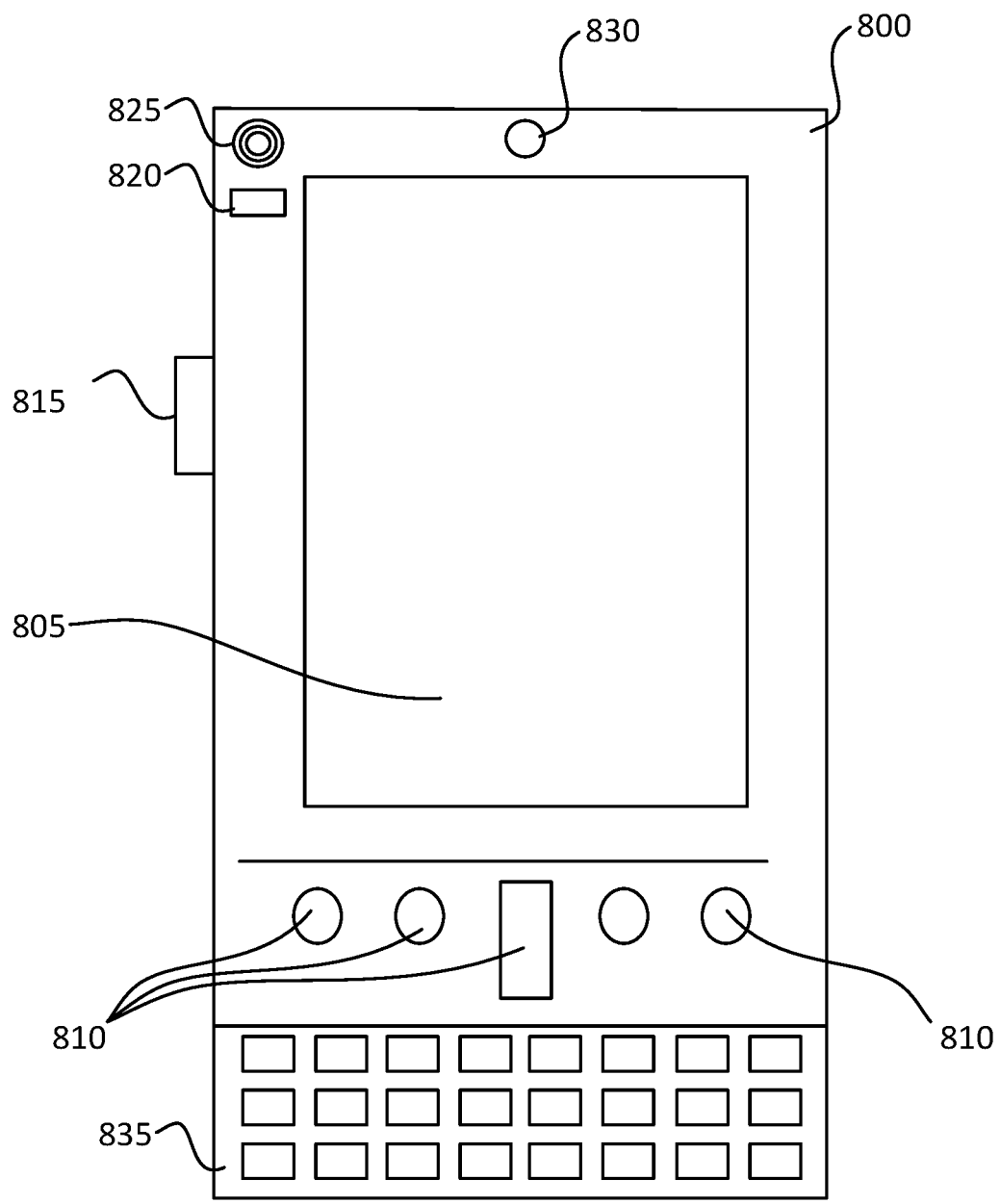
FIGS. 8A and 8B are simplified block diagrams of a mobile computing device with which aspects of the present disclosure may be practiced.
Figure 8B:
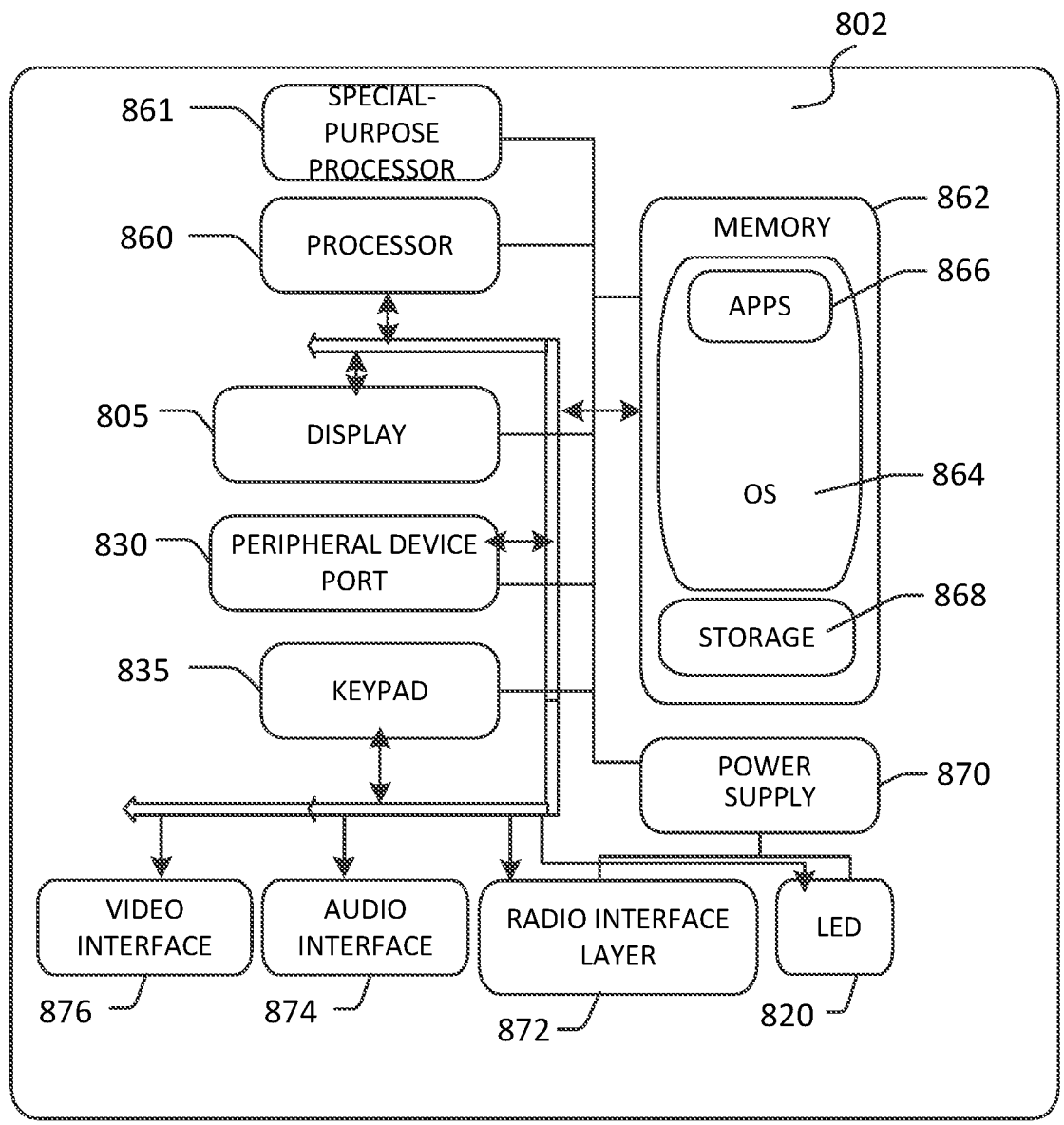

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display).

If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments.

In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display.

In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein (e.g., search engine, extractor module, relevancy ranking module, answer scoring module).

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor(s) (e.g., processor 860 and/or special-purpose processor 861) and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

Figure 9:
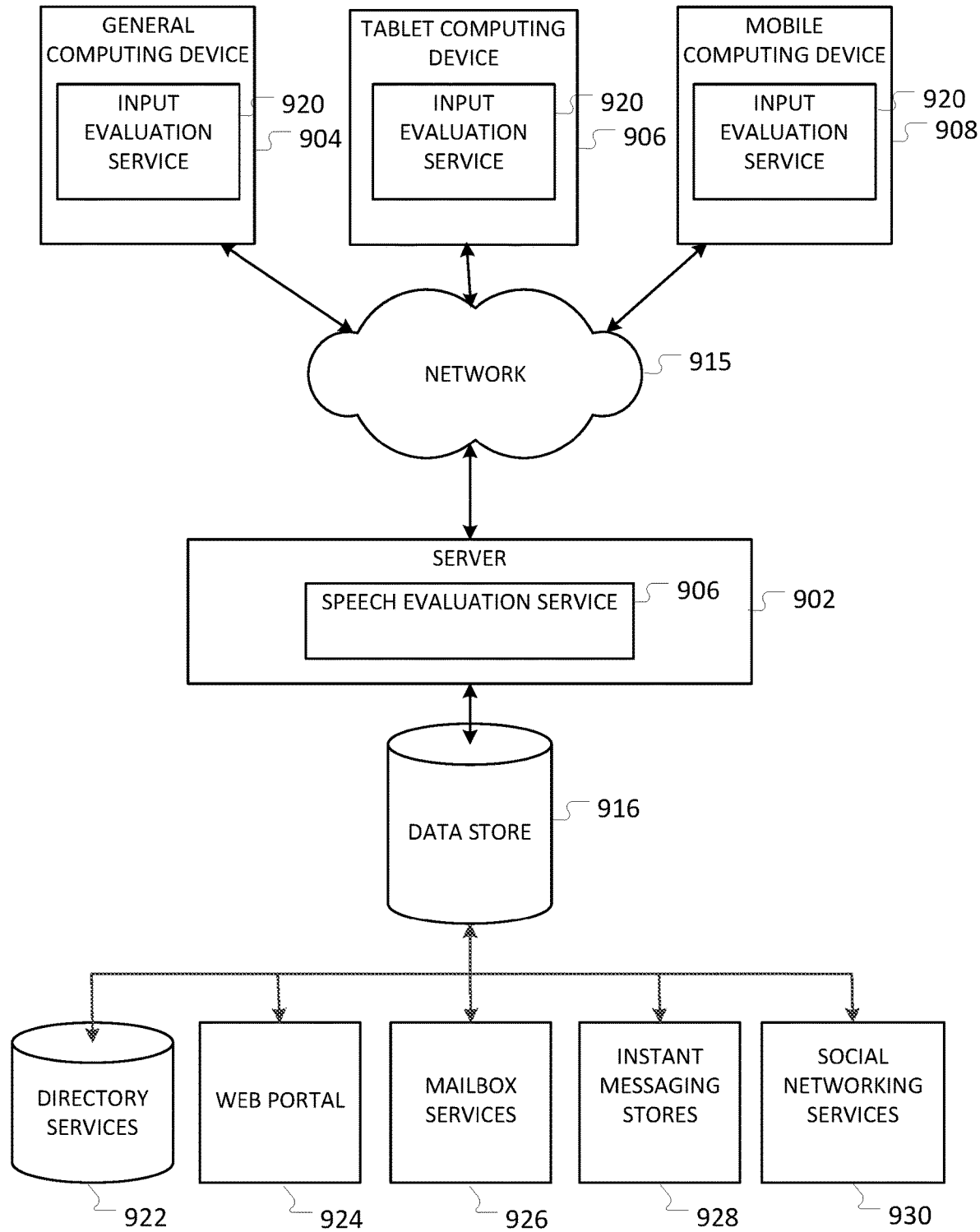
FIG. 9 is a simplified block diagram of a distributed computing system in which aspects of the present disclosure may be practiced.

FIG. 9 illustrates one aspect of the architecture of a system for processing data received at a computing system from a remote source, such as a personal computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930.

An input evaluation service 920 may be employed by a client that communicates with server device 902, and/or input evaluation service 920 may be employed by server device 902. The server device 902 may provide data to and from a client computing device such as a personal computer 904, a tablet computing device 906 and/or a mobile computing device 908 (e.g., a smart phone) through a network 915. By way of example, the computer system described above may be embodied in a personal computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Figure 10:
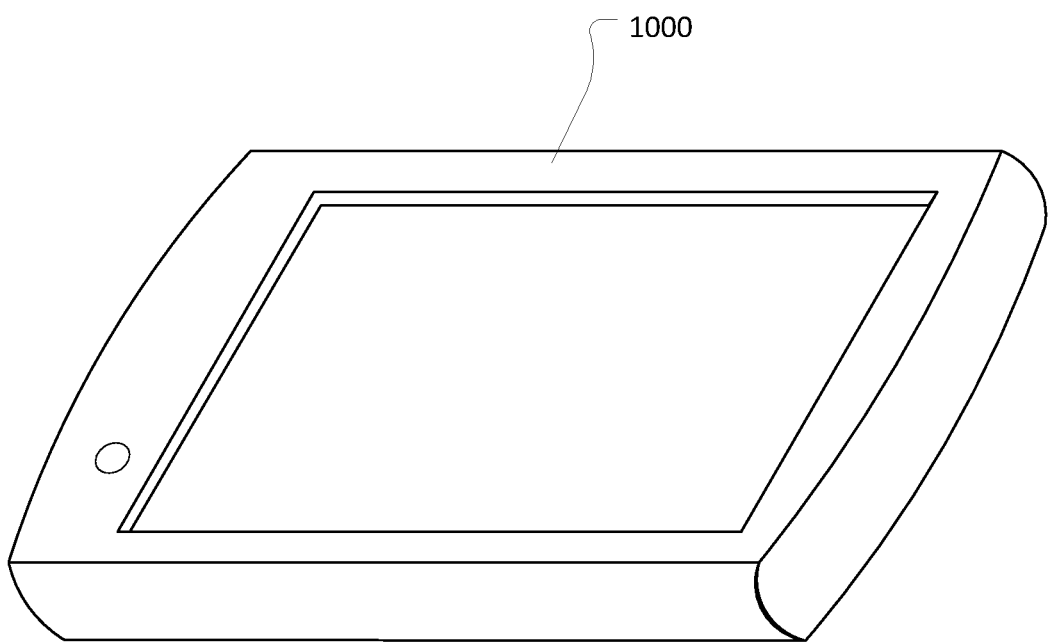
FIG. 10 illustrates a tablet computing device for executing one or more aspects of the present disclosure.

FIG. 10 illustrates an exemplary tablet computing device 1000 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   a processor; and
   memory coupled to the processor, the memory comprising computer executable instructions that, when executed by the processor, performs a method comprising:
      receiving input referencing a first content item;
      processing the input to identify one or more terms associated with the first content item;
      using the one or more terms to search a data source, wherein searching the data source comprises:
         identifying the first content item;
         identifying one or more additional content items implicitly linked to the first content item based on stated relationships between the first content item and the one or more additional content items, the stated relationships being stored in the data source, wherein the implicit linking indicates at least one of:
            at least a portion of the first content item has been inserted into the one or more additional content items; or
            the one or more additional content items comprise a semantic reference to at least a portion of the first content item, the semantic reference implicitly referring to the at least a portion of the first content item and being stored in the data source as a stated relationship of the stated relationships; and
         creating a set of search results comprising the first content item and the one or more additional content items;
      ranking the set of search results; and
      providing the ranked set of search results.

2. The system of claim 1, wherein processing the input further comprises at least one of:
   identifying additional terms relating to the one or more terms; or
   identifying one or more topics associated with the one or more terms.

3. The system of claim 1, wherein the data source is a graph database, and searching the data source comprises using at least one of:
   regular expressions;
   fuzzy logic; or
   a pattern recognition model.

4. The system of claim 1, wherein the data source comprises one or more implicit link indicators indicating an implicit relationship between the first content item and one or more content items in the set of content items.

5. The system of claim 1, wherein the set of search results further comprises one or more content items not implicitly linked to first content item.

6. The system of claim 1, wherein ranking the set of search results is further based on at least one of:
   an explicit link relationship of the first content item;
   a number of views; or
   a number of times referenced.

7. The system of claim 6, wherein ranking the set of search results is further based on at least one of:
   viewer attributes;

author attributes;
semantic analysis data;
modification time data; or
viewing session metrics.

8. The system of claim 1, wherein ranking the set of search results comprises using a ranking algorithm to assign an attribute score to one or more attributes of content items in the set of search results.

9. The system of claim 8, wherein a content item score for each content item in the set of search results is generated using one or more attribute scores.

10. The system of claim 9, wherein the set of search results is ranked according to the content item score for each content item in the set of search results.

11. The system of claim 1, wherein the input identifying the first content item is received during user interaction with an application, and wherein providing the ranked set of search results comprises presenting the ranked set of search results in a context of the application.

12. The system of claim 1, the method further comprising:
prior to receiving input identifying the first content item, detecting an implicit link action that links the first content item to a second content item;
identifying information associated with the first content item, the second content item, and the implicit link action; and
updating the data source to include an implicit relationship between the first content item and the second content item.

13. The system of claim 12, wherein the implicit link action corresponds to at least one of:
a copy/paste action;
a cut/paste action; or
providing a reference to the first content item.

14. The system of claim 12, wherein identifying the information comprises at least one of:
identifying one or more input types;
identifying a user identifier; or
identifying entry point information.

15. A method comprising:
receiving input referencing a content item;
processing the input to identify a term or a concept relating to the content item;
using the term or the concept to search a data source, wherein searching the data source comprises:
identifying a search result based on the term or the concept;
identifying one or more additional content items comprising an implicit link to the search result based on stated relationships between the content item and the one or more additional content items, the stated relationships being stored in the data source, wherein the implicit link is identified in the data source using a corresponding relationship indicator, and wherein the implicit link indicates at least one of:
at least a portion of the search result has been inserted into the one or more additional content items; or
the one or more additional content items comprise a semantic reference to at least a portion of the content item, the semantic reference implicitly referring to the at least a portion of the content item and being stored in the data source as a stated relationship of the stated relationships; and
creating a set of search results comprising the search result and the one or more additional content items;
ranking the set of search results; and
providing the ranked set of search results as authoritative with respect to the content item.

16. The method of claim 15, wherein the set of search results further comprises one or more additional content items not comprising an implicit link to the search result.

17. The method of claim 16, wherein ranking the set of search results comprises prioritizing the one or more additional content items comprising the implicit link over the one or more additional content items not comprising the implicit link.

18. The method of claim 15, wherein ranking the set of search results comprises selecting a top 'N' search results, wherein the search result is not included in the top 'N' search results.

19. The method of claim 15, wherein the search result is not the content item.

20. A computer-readable storage device not consisting of a propagated data signal and storing computer executable instructions that when executed cause a computing system to perform a method comprising:
receiving input referencing a content item;
processing the input to identify a term or a concept relating to the content item;
using the term or the concept to search a data source, wherein searching the data source comprises:
identifying a search result based on the term or the concept;
identifying one or more additional content items comprising an implicit link to the search result based on stated relationships between the content item and the one or more additional content items, the stated relationships being stored in the data source, wherein the implicit link is identified in the data source using a corresponding relationship indicator, and wherein the implicit link indicates at least one of:
at least a portion of the search result has been inserted into the one or more additional content items; or
the one or more additional content items comprise a semantic reference to at least a portion of the content item, the semantic reference implicitly referring to the at least a portion of the content item and being stored in the data source as a stated relationship of the stated relationships; and
creating a set of search results comprising the search result and the one or more additional content items;
ranking the set of search results; and
providing the ranked set of search results.

* * * * *